(12) United States Patent
Pogrebinsky

(10) Patent No.: US 6,661,793 B1
(45) Date of Patent: Dec. 9, 2003

(54) METHOD AND APPARATUS FOR RECONSTRUCTING MEDIA

(75) Inventor: Vladimir Pogrebinsky, Bat-Yam (IL)

(73) Assignee: Vocaltec Communications Ltd., Herzliya (IL)

( * ) Notice: Subject to any disclaimer, the term of this patent is extended or adjusted under 35 U.S.C. 154(b) by 0 days.

(21) Appl. No.: 09/233,012

(22) Filed: Jan. 19, 1999

(51) Int. Cl.[7] .............................................. H04L 12/28
(52) U.S. Cl. ...................................... 370/394; 370/470
(58) Field of Search ................................ 370/216, 229, 370/235, 252, 350, 352, 354, 356, 389, 392, 394, 395.5, 395.3, 470, 474, 471, 476, 503, 510; 709/224; 714/758

(56) References Cited

U.S. PATENT DOCUMENTS

| | | | |
|---|---|---|---|
| 4,907,277 A | * | 3/1990 | Callens et al. .............. 704/202 |
| 5,608,450 A | | 3/1997 | Agarwal et al. |
| 5,657,316 A | * | 8/1997 | Nakagaki et al. ........... 370/394 |
| 5,790,532 A | | 8/1998 | Sharma et al. |
| 5,956,729 A | * | 9/1999 | Goetz et al. ................. 707/104 |
| 6,230,297 B1 | * | 5/2001 | Bentall et al. .............. 714/758 |

FOREIGN PATENT DOCUMENTS

WO 97/15983 5/1997

OTHER PUBLICATIONS

H. Sanneck; Adaptive Loss Concealment for Internet Telephony Applications; pp. 1–19; Jan. 17, 1999.

* cited by examiner

Primary Examiner—Chi Pham
Assistant Examiner—Alexander O. Boakye
(74) Attorney, Agent, or Firm—Katten Muchin Zavis Rosenman

(57) ABSTRACT

A method and apparatus for reconstructing media at a receiver from a media stream which includes a plurality of data packets wherein each data packet includes at least one media field. The media stream is monitored by a monitoring device and a packet pattern of the media stream is evaluated. An estimating device estimates a media time of at least one lost packet for reconstructing media by a reconstructing device at the receiver.

6 Claims, 3 Drawing Sheets

METHOD AND APPARATUS FOR RECONSTRUCTING MEDIA

FIELD OF THE INVENTION

The present invention relates to, but is not limited to, a method and apparatus for reconstructing media, and more particularly to a method and a media receiver operative at an Internet multimedia device for reconstructing data packets, which comprises media information.

BACKGROUND OF THE INVENTION

Internet Protocol (IP) telephony art includes a plurality of computer programs and applications which enable users to transmit and receive multimedia information such as audio, video and text over the Internet. Those applications known in the art as multimedia transceivers. An example for such an application, is an application for performing telephone calls over the Internet, for example, INTERNET PHONE® from VocalTec® communications of Herzelia, Israel.

A short description of a method of performing telephone calls over the Internet will be given now. A first user dial through a computer keyboards the number of a second user. The application, e.g. INTERNET PHONE®, transfers the dial signals to a public telephony switching center for initiating the call. After establishing the call between users, the application digitally samples the voice of the first user, temporary stores the samples in a buffer, packages the samples into packets and transmits the packets using IP protocol to the second user. The application of the second user, e.g. INTERNET PHONE®, receives the packets, strips the protocol headers from each packet to provide compress voice data samples, and converts the samples into voice. The method for transferring voice over the Internet which was described above, is done at both sides.

However, when transmitting media streams which include, for example, packets of audio and/or video, over the Internet, the packets may arrive in different time and order from which they have been transmitted. A special parameter is provided in each transmitted packet for reconstructing the packets of the stream at a receiver.

One example for the above mentioned special parameter, is a sequence number which is added to each packet and used to help the receiver to reconstruct the packets order. Another example is to add a timestamp to each packet which reflects the sampling instant of the first byte in the packet and used to reconstruct the media stream in the receiver in accordance with the time of sampling.

The disadvantage of using the timestamp parameter is that the data packet length is increased, thus a bit rate which is required for transmitting media over the network is increased.

There is a need for a method and apparatus for transmitting data packets, which mitigates the above disadvantage.

SUMMARY OF THE INVENTION

In a first aspect of the present invention there is provided a method for reconstructing media at a receiver from a media stream. The media stream includes a plurality of packets wherein each packet includes at least one media field. The method includes the steps of: monitoring said media stream, studying a packet pattern of the media stream, and estimating at least one media parameter of at least one lost packet for reconstructing media lost information at said receiver.

Advantageously, the method reconstructed media of media stream with changing packet size without using an information of media timestamp which is provided in each packet. Thus, the timestamp parameter may be estimated at the receiver and may not be transmitted with every packet. This reduces the required bandwidth for transmitting media over the network.

In the preferred embodiment of the invention, the step of estimating further includes the steps of: identifying at least one type of media pattern, and employing a method for estimating at least one media parameter in accordance with said type of media pattern.

In this manner, said media parameter is a media length which is the sum of media frames length of said packet of said media stream.

In this manner, said media pattern is a media length pattern of the media stream.

In this manner, said media pattern is virtually a fixed pattern and/or variable pattern.

In the preferred embodiment of the present invention, the method for reconstructing media includes the steps of: providing a sequence number to each packet of said stream, estimating said media length in accordance with the stream pattern, subtracting a sequence number of the previously received packet from a sequence number of a successive packet for calculating the number of packets which have been lost and reconstructing the media in accordance with the number of packets lost.

In yet another preferred embodiment of the invention, the method for reconstructing media includes the steps of estimating said media length in accordance with a first virtually fixed pattern for providing a first estimated media length, estimating said media length in accordance with a second virtually fixed pattern for providing a second estimated media length, and selecting a media length of the maximum value between said estimated media length, for reconstructing the media information of at least one lost packet.

In a second aspect of the invention there is provided an apparatus for reconstructing media at a receiver from a media stream. The media stream includes a plurality of data packets wherein each data packet includes at least one media field. The apparatus includes a monitor device for monitoring said media stream, a processing device for studying packet pattern of the media stream and for estimating a media length of at least one lost packet, and a reconstructing device for reconstructing media information at said receiver.

In this manner, the processing device further includes an identifier for identifying at least one type of packets pattern and an estimator for estimating said media length in accordance with said type of packets pattern.

In the preferred embodiment of the invention, the processing device employing at least two method for reconstructing media with accordance to said stream pattern.

In this manner, the first method includes the steps of: providing a sequence number to each packet of said stream, estimating said media length in accordance with the stream pattern, subtracting a sequence number of the previously received packet from a sequence number of a successive packet for calculating the number of packets which have been lost, and reconstructing the media information in accordance with the number of packets lost.

In this preferred embodiment of the invention, a second method for reconstructing media includes the steps of: estimating said media length in accordance with a first type of stream pattern for providing a first estimated media length; estimating said media time with accordance to a second type of stream pattern for providing a second estimated media length and selecting a media length of the maximum value between said estimated media length for reconstructing the media information of at least one lost packet.

Preferably, the reconstructing device interpolates a first media frame information with a second media frame information for providing interpolated media information of the length of lost media. This reconstructed media is inserted at the place of said lost media.

The preferred embodiments will be described now by way of example only and with reference to the drawing.

DETAILED DESCRIPTION OF THE INVENTION

Figure 1:
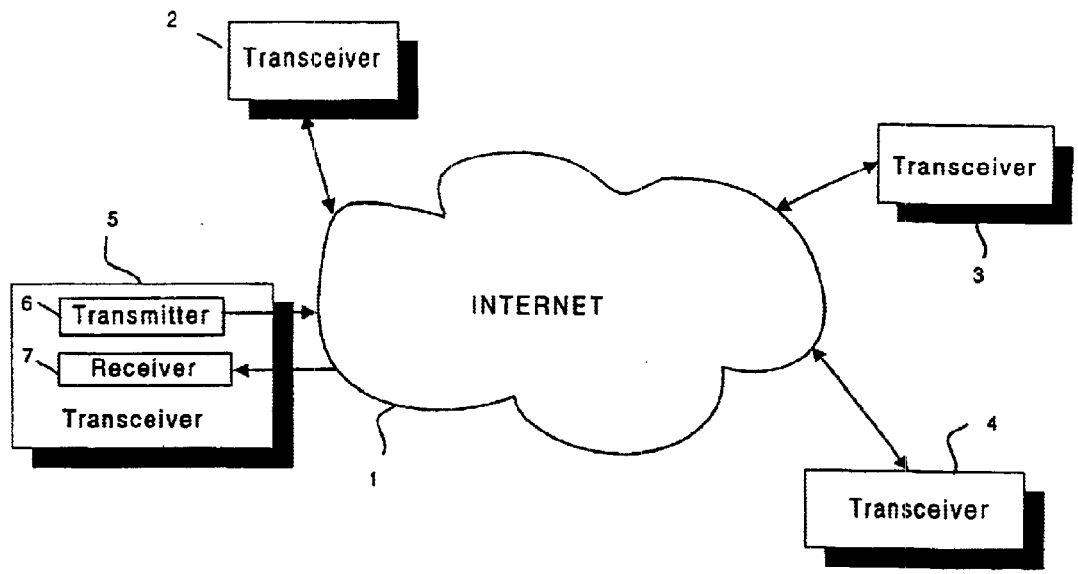
FIG. 1 is a block diagram of a wide area network.

Referring firstly to FIG. 1, a plurality of media transceivers 2, 3, 4 and 5 are operably connected to a Wide Area Network (WAN) 1, e.g. the Internet. Each transceiver 5 further includes a transmitter 6 and a receiver 7. The media transceivers 2, 3, 4, and 5 are communicating with each other via Internet protocol (IP), for example, TCP/IP. The media transceivers 2, 3, 4, and 5 are transmitting and receiving media streams which include a plurality of packets. A detailed description of a packet structure will be given now with reference to FIG. 2.

Figure 2:
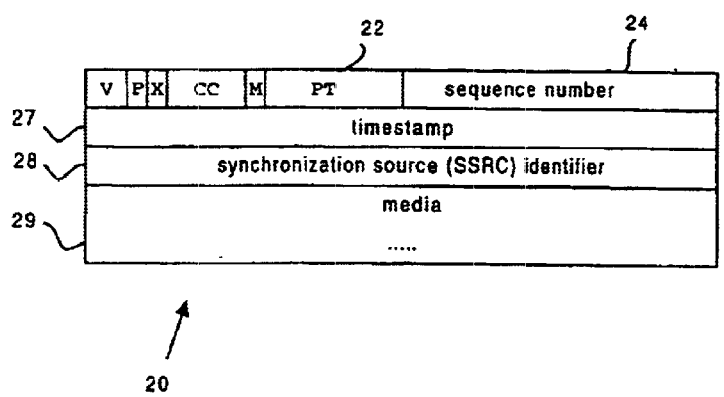
FIG. 2 is a detailed block diagram of a data packet, according to RFC 1889 protocol.

FIG. 2 is a description of a packet 20 in accordance with a real time protocol (RTP), RFC 1889. The packet 20 includes a plurality of fields of 32 bits.

The first five fields, Version field (V), Padding field (P), extension field (X), CSRC count field (CC) and the marker field (M) are not at the scope of the present invention and hence, will not be describe. A brief description of other fields will be given now.

A payload type (PT) field 22 identifies the format of the RTP media data an determines its interpretation by an application.

A sequence number field 24 increments by one for each RTP data packet sent, and may be used by the receiver to detect packet loss and to restore packet sequence. The sequence number field 24 is 16 bits field.

A timestamp field 27 includes 32 bits and reflects the time of the sampling instant of the first byte of the present packet. The sampling instant must be driven from a clock that increments monotonically and linearly in time to allow synchronization and jitter calculation of media samples. In the preferred embodiment of the invention this field is not used and reconstructing of packet sequence is done with the sequence number field 24.

A synchronization source identifier field 28 includes 32 bits and identifies the synchronization source.

The last field is a payload field 29 which includes compressed media samples. The compress media samples may be audio or video samples. In a preferred embodiment, a G.723 codec is used with a bit rate of 6400 bit per second. The audio samples are arranged in frames. Each frame includes 240 audio samples which are compressed into 24 bytes wherein each byte includes 8 bits. The number of media frames may be varied in accordance with the network 1 bandwidth and load.

Figure 3:
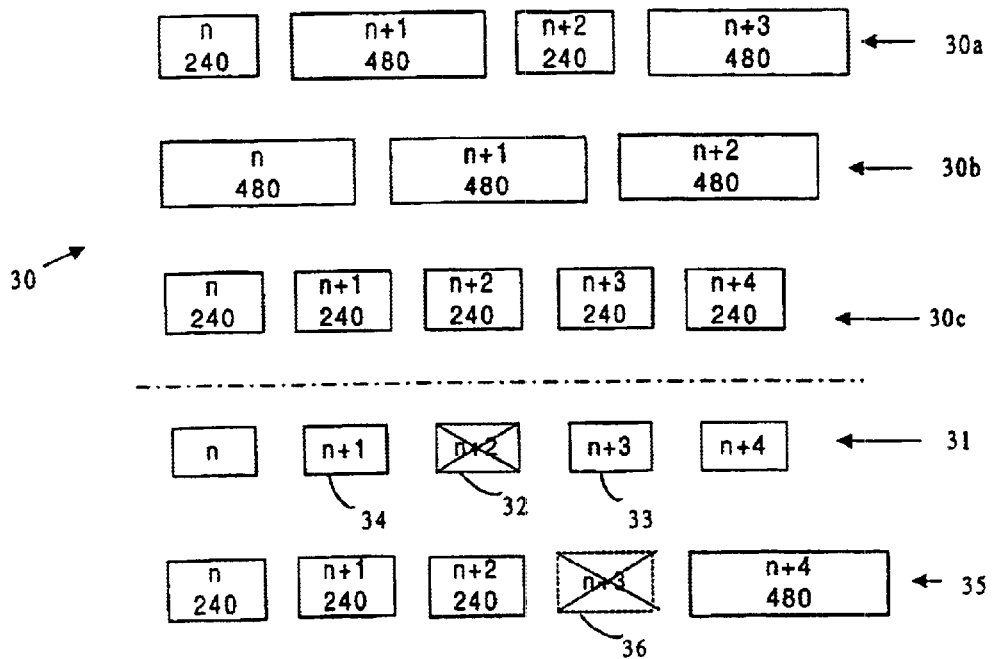
FIG. 3 is an illustration of stream patterns in accordance with a preferred embodiment of the invention.

Referring now to FIG. 3 examples of media stream patterns 30a, 30b and 30c are shown. Media stream 30 may be transmitted in several media patterns. A media pattern 30a employs packets with varied media length of 240 and 480 samples. The packet 20 in the media pattern 30a employs one media frame or two media frames. A media pattern 30b employs a fixed pattern of two media frames per packet. A media pattern 30c employs a fixed pattern of one media frame per packet. A media stream 31 is an example of a stream with a fixed media pattern which includes a lost packet 32. The stream 31 includes a plurality of packets. Packet 34 is the packet which was received previously to the lost packet 32 and packet 33 is the packet which received next to packet 34. Media stream 35 employs a variable media pattern and includes a lost packet 36. Each packet in the above described streams includes a sequence number "n" and the number of compressed audio samples. For example, in media pattern 30a packet "n+3" includes 480 compressed samples.

Figure 4:
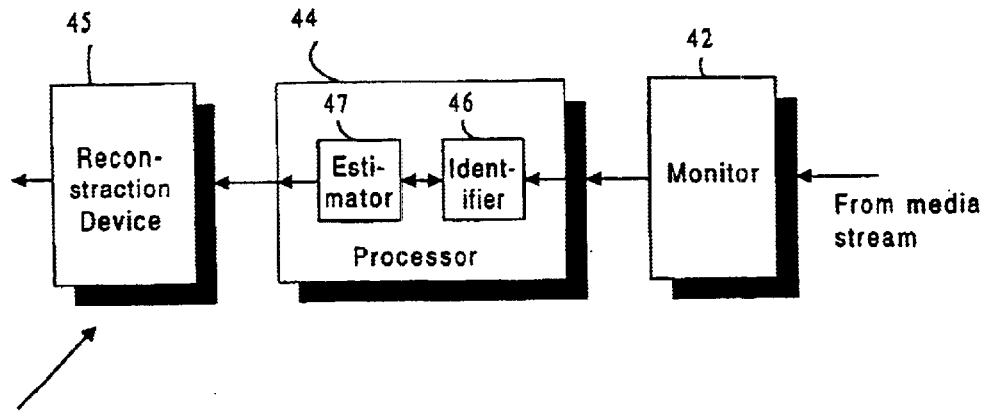
FIG. 4 is a block diagram of an apparatus for reconstructing media at a receiver according to the preferred embodiment of the invention.

A preferred embodiment of the invention will be described now with reference to FIG. 4. An apparatus 40 for reconstructing media at the receiver 7 from a media stream 30 is shown. The apparatus 40 includes a monitor device 42 for monitoring said media stream 30, a processing device 44 for studying or evaluating media pattern 30a of the media stream 30 and for estimating a media length of at least one lost packet 32 and a reconstructing device 45 for reconstructing media at the receiver 7. Typically, the media length is a sum of media frames length in a packet 20. The processing device 44 further includes an identifier 46 for identifying at least one type of media pattern 30a and an estimator 47 for estimating the media length in accordance with the type of media pattern 30a. An one example of one type of media pattern is media pattern 30a which is virtually fixed. Another example is a varying media pattern 35 which employs a varying media length at each packet.

In operation, the monitor 42 monitors media streams at network 1. The processing device 44 studies the media pattern of the stream and the identifier 46 identifies the media pattern type. When there is a media stream 31 with a lost packet 32, the estimator estimates the media length of the lost pack 32 in accordance with the stream pattern. The estimator 47 uses the media length of the lost packet to reconstruct the media frame. The reconstructing device 45 may employ at least one method for reconstructing the lost media information. For example, inserting comfort noise having the length of lost media for replacing lost media information or, interpolating a first media frame information with a second media frame information for providing interpolated media information at the length of lost media. The first media frame 34 is the frame that was received before the lost media and the second media frame 33 is the frame that was received after the lost media 32. The processing device 44 employs a method for reconstructing media which is illustrated at FIG. 5.

Figure 5:
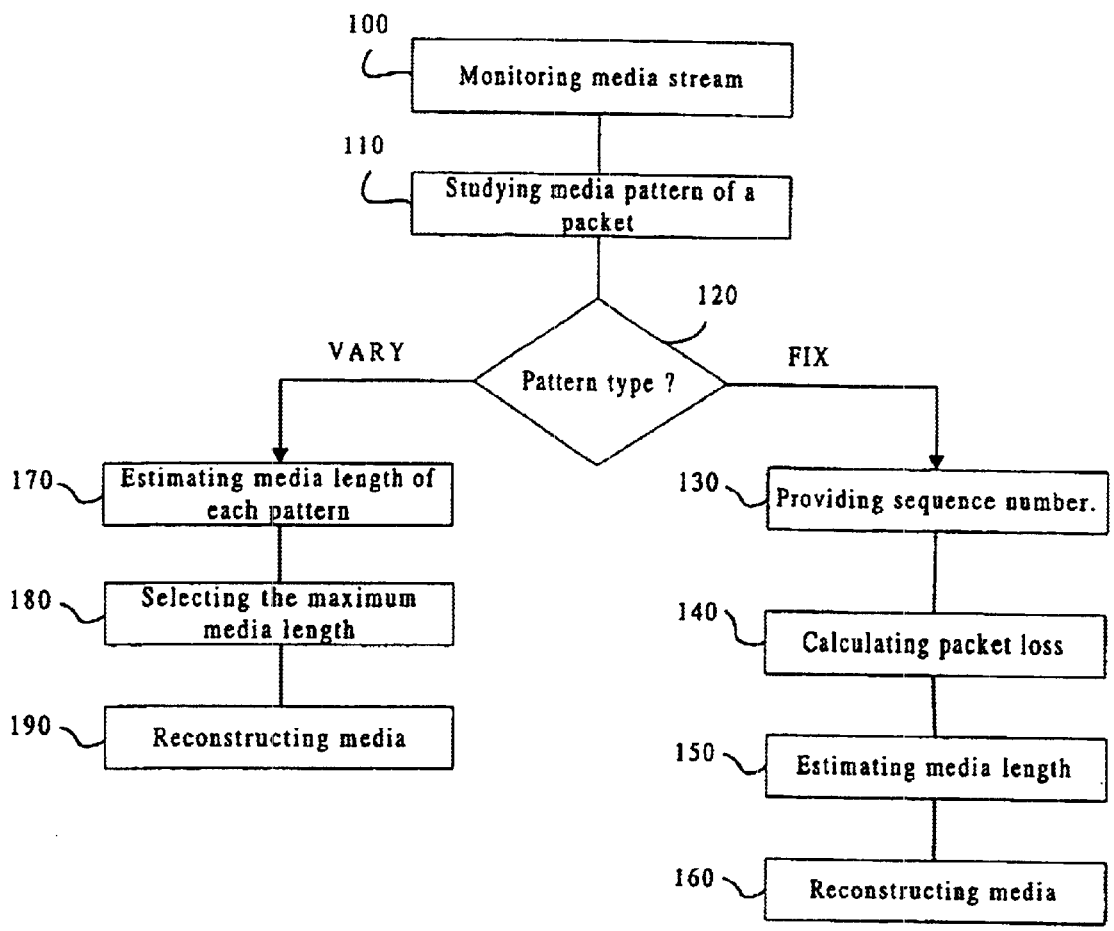
FIG. 5 is a flow chart of a method of reconstructing media at a receiver according to a preferred embodiment of the invention.

Referring now to FIG. 5, a flow chart of a method for reconstructing media is shown. The first step 100 is monitoring media stream 30. The next step, step 110 is studying or evaluating the media pattern of the packet 20. Step 120 is identifying the pattern type. If the pattern type is a virtually fixed pattern, for example 30a, 30b or 30c, then the processing device 44 will performs steps 130 to 160. If the pattern type is varying, for example, media pattern 35, the processing device 44 will performs steps 170 to 190.

Referring first to steps 130 to 160 these steps illustrate a method for reconstructing media of virtually fixed pattern. The processing device 44 reads from the data packet 20 the sequence number field 24 and provides the sequence number to the estimator 47, as is shown in step 130. In the next step, step 140, the estimator 47 calculates the size of the lost packet 32 by subtracting a sequence number of the previously received packet 34 from a sequence number of a successive received packet 33 plus one. The result of the above calculation is a number of packets which have been lost. The estimator 47 estimates the media length in accordance with a codec type, as is shown in step 150. For example, an audio frame length of audio samples which are compressed with G.723 codec is 24 bytes which includes 240 samples. The time of audio in frame is 30 milliseconds. A more particular example is shown with media stream pattern 30b which employs two lost media frames. Hence, estimated media length is 480 samples or 48 bytes. The next step, step 160 is reconstructing the media in accordance with the number of lost media frames. The reconstructing device 45, may reconstruct the lost media by copying the last received media field and inserting it at the place of the lost media field or by inserting comfort noise. Another example for reconstructing the lost media information in interpolating a first media frame information with a second media frame information for providing interpolated media information at the length of lost media.

In summary, the receiver 7 recognizes the pattern of the media stream 30 by looking at few received packets and predicts a size of each packet on the basis of its sequence number. For example, if there is a packet loss and packet 32 did not arrive, then receiver 7 can predict the size of lost packet 32 and hence can estimate how much media were lost, hence, how many milliseconds of audio are missing. When packet with field 32 is lost, receiver 7 recognizes that one field is missing. Thus, the receiver 7 can estimate media length of each packet of the media stream of a virtually fixed pattern.

Referring now to steps 170 to 190 in FIG. 5, a method for reconstructing media of a varying stream pattern will be described now. Step 170 is the estimating of a packet size of each received packet as described above in steps 130 to 140. Step 180 is the selecting of the maximum packet size from the above estimated packet size. The last step, step 190 is the reconstructing of the media as it was described above. However, step 170 may be the estimating of media length in accordance with a first virtually fixed stream pattern, for example, stream pattern 30b, for providing a first estimated media length. Estimating media length in accordance with a second virtually fixed stream pattern, for example, stream pattern 30c is for providing a second estimated media time.

The above approach can be described by:

Hole Size=MAX(HoleSize$_1$, HoleSize$_2$);

where

HoleSize$_1$ is estimated using first media pattern 30b; and
HoleSize$_2$ is estimated using second media pattern 30c.

When the above estimation involves a mistake the predicted size of a hole is always greater than the actual size hole. This makes the receiver 7 to reconstruct more media than needed which causes increment in delay and to increment the amount of media in the receiver jitter buffer. There are several techniques to handle media in a jitter buffer. An example for such method is described in U.S. Pat. No. 5,825,771 which is herein incorporated by reference.

The method and the apparatus which have been described above allow estimating of lost media length of a changing packet size and define behavior of the media transceiver 2, 3, 4 or 5. Thus, estimating of media length may be done at the receiver 7 and the timestamp field 27 may not be transmitted with every packet 20. This reduce bandwidth required for transmitting media over the network 1.

What is claimed is:

1. A method for reconstructing media at a receiver from a media stream which includes a plurality of data packets, wherein each data packet includes at least one media field, the method comprising the steps of:

monitoring said media stream by monitoring means of the receiver;

studying a media pattern of said media stream by processing means at the receiver; estimating at least one media length of at least one lost packet by said processing means;

providing a sequence number to each packet of said media stream;

subtracting a sequence number of a previously received packet from a sequence number of a successive packet for calculating a number of packets which have been lost;

estimating said media length in accordance with a media pattern; and reconstructing lost media information in accordance with lost media length.

2. A method for reconstructing media at a receiver from a media stream which includes a plurality of data packets, wherein each data packet includes at least one media field, the method comprising the steps of:

monitoring said media stream by monitoring means of the receiver;

studying a media pattern of said media stream by processing means at the receiver;

estimating at least one media parameter of at least one lost packet by said processing means;

estimating media time in accordance with a first virtually fixed media pattern for providing a first estimated media time;

estimating said media time in accordance with a second virtually fixed media pattern for providing a second estimated media time; and selecting from said first and second estimated media time a media time with a maximum value for reconstructing lost media information of at least one lost packet at said receiver.

3. A method for reconstructing media at a receiver from a media stream which includes a plurality of data packets, wherein each packet includes at least one media field, the method comprising the steps of:

monitoring said media stream by monitoring means of the receiver;

studying a media pattern of said media stream by processing means at the receiver;

estimating at least one media parameter of at least one lost packet by said processing means; and interpolating a first media frame information with a second media frame information for providing interpolated media information of the length of lost media at said receiver.

4. An apparatus for reconstructing media at a receiver from a media stream which includes a plurality of data packets, wherein each data packet includes at least one media field, the apparatus comprising:

a monitor device for monitoring said media stream;

a processing device for studying a media stream pattern, and for estimating a media length of at least one lost packet; and a reconstructing device for reconstructing lost media information at said receiver;

wherein said processing device provides a sequence number to each packet of said stream;

subtracts a sequence number of a previous received packet from a sequence number of a successive packet for calculating the number of packets which are lost;

estimates said media length in accordance with said media pattern; and said reconstructing device reconstructs the media in accordance with the number of packets which were lost.

5. An apparatus for reconstructing media at a receiver from a media stream which includes a plurality of data packets, wherein each data packet includes at least one media field, the apparatus comprising:

a monitor device for monitoring said media stream;

a processing device for studying a media stream pattern, and for estimating a media length of at least one lost packet; and a reconstructing device for reconstructing lost media information at said receiver;

wherein said processing device estimates said media length in accordance with a first type of a media pattern for providing a first estimated media length;

estimates said media length in accordance with a second type of a media pattern for providing a second estimated media length; and selects a media length with a maximum value between said first and second estimated media length for reconstructing the media of at least one lost packet.

6. An apparatus for reconstructing media at a receiver from a media stream which includes a plurality of data packets, wherein each data packet includes at least one media field, the apparatus comprising:

a monitor device for monitoring said media stream;

a processing device for studying a media stream pattern, and for estimating a media length of at least one lost packet; and a reconstructing device for reconstructing lost media information at said receiver;

wherein said reconstructing device interpolates a first media frame information with a second media frame information for providing interpolated media information of the length of lost media.

* * * * *